(12) United States Patent
Ricci

(10) Patent No.: US 10,101,034 B2
(45) Date of Patent: Oct. 16, 2018

(54) GAS OVEN

(71) Applicant: ITALFORNI PESARO S.r.l., Pesaro (Pesaro Urbino) (IT)

(72) Inventor: Andrea Ricci, Pesaro (IT)

(73) Assignee: ITALFORNI PESARO S.R.L., Pesaro (IT)

( * ) Notice: Subject to any disclaimer, the term of this patent is extended or adjusted under 35 U.S.C. 154(b) by 486 days.

(21) Appl. No.: 14/509,383

(22) Filed: Oct. 8, 2014

(65) Prior Publication Data
US 2015/0184865 A1 Jul. 2, 2015

(30) Foreign Application Priority Data

Oct. 3, 2013 (IT) ............................... BO2013A0548

(51) Int. Cl.
*F24C 3/04* (2006.01)
*F24C 15/24* (2006.01)
(Continued)

(52) U.S. Cl.
CPC ............... *F24C 3/045* (2013.01); *A21B 1/28* (2013.01); *A21B 1/40* (2013.01); *A21B 1/48* (2013.01); *F24C 3/082* (2013.01); *F24C 15/24* (2013.01)

(58) Field of Classification Search
CPC .......... F24C 3/045; F24C 3/082; F24C 15/24; A21B 1/28; A21B 1/40
(Continued)

(56) References Cited

U.S. PATENT DOCUMENTS 3,626,922 A * 12/1971 Borge .................. F24C 15/322
126/21 A
3,721,805 A * 3/1973 Barratt ..................... A21B 1/40
219/388
(Continued)

FOREIGN PATENT DOCUMENTS

AU 47857 68 A 6/1970
DE 353 201 C 5/1922
(Continued)

OTHER PUBLICATIONS

Search Report and Written Opinion dated Aug. 11, 2014 for corresponding Italian Patent Application No. BO2013A000548.

*Primary Examiner* — Avinash Savani
*Assistant Examiner* — Rabeeul Zuberi
(74) *Attorney, Agent, or Firm* — Shuttleworth & Ingersoll, PLC; Timothy J. Klima

(57) ABSTRACT

A gas oven comprises an oven space, having a bottom baking surface, two side walls rising up on opposite sides of the baking surface and at least one top wall facing the baking surface, burner means configured to raise the temperature of the oven space and a control unit associated with the burner means and configured to drive them as a function of a command given by a user to determine a preset temperature inside the oven space. The burner means comprise at least a first radiating element and a second radiating element which are independent of one another and which are configured to vary the temperature at the baking surface and at the top wall, respectively, and the control unit comprises at least a first drive module and a second drive module associated with the first radiating element and with the second radiating element, respectively, in order to control the first radiating element and the second radiating element independently of one another.

8 Claims, 2 Drawing Sheets

(51) Int. Cl.
  *F24C 3/08* (2006.01)
  *A21B 1/40* (2006.01)
  *A21B 1/48* (2006.01)
  *A21B 1/28* (2006.01)

(58) Field of Classification Search
  USPC .............. 126/21 A, 21 R; 432/235, 239–246
  See application file for complete search history.

(56) References Cited

U.S. PATENT DOCUMENTS 3,767,829 A * 10/1973 Karr ...................... A23L 3/0055
                                                            426/234
4,901,705 A *  2/1990 Takata .................... F24C 3/087
                                                            126/19 R
5,127,824 A *  7/1992 Barker ................ A47J 37/0713
                                                            126/41 R

FOREIGN PATENT DOCUMENTS

EP         1 452 094 A2    9/2004
GB           720 504 A    12/1954
GB         1 462 693 A     1/1977

* cited by examiner

GAS OVEN

BACKGROUND OF THE INVENTION

This invention relates to a gas oven, of the type used to bake food products, preferably a gas oven used to bake a multiplicity of products but especially pizza, focaccia, pita, tortillas, piadina, bruschetta, crostini and the like.

Thus, the invention is applicable in particular in the food industry and in catering, both traditional and industrial (or for canteen services).

Gas ovens known in the prior art fall broadly into two categories, those equipped with blown air burners and those equipped with atmospheric burners (or air suction burners).

This invention addresses in particular burners of the second category but without excluding possible and advantageous use also in ovens equipped with blown air burners.

Gas ovens with atmospheric burners known up to now come in a multiplicity of forms, substantially all having in common an oven space, delimited at the bottom by a baking surface (either fixed or mobile) and a combustion chamber, usually located under the baking surface in order to heat it.

In order to distribute the heat inside the oven space more uniformly, one or more ducts extending from the burners towards the top of the oven space have in some cases been introduced to allow the floor (that is, the zone proximal to the baking surface) and the ceiling (that is, the zone distal from the baking surface) of the oven space to be heated in the same way.

This has certainly considerably improved heat distribution and product baking uniformity. It has not, however, solved another problem which gas ovens, especially those with atmospheric burners, have always suffered from.

In effect, although baking uniformity is in many cases an important goal to be accomplished, it is not desirable for all types of baked food products which, in some cases, may require the product base ("moister") to be baked at a different temperature from the product top (crispier or more delicate).

Disadvantageously, all the solutions which have been proposed up to now do not solve this problem because the heat recirculation ducts do not allow regulating the temperature of the gas flowing through them.

The aim of this invention is to provide a gas oven capable of overcoming the above mentioned disadvantages of the prior art.

More precisely, the aim of this invention is to provide a gas oven, of the type used to bake food products and capable of guaranteeing optimum baking efficiency for different types of products.

A further aim of the invention is to provide a gas oven used to bake food products and which is high in performance and low in production costs.

SUMMARY OF THE INVENTION

These aims are achieved by a gas oven having the features set out in one or more of the appended claims and, more specifically, which comprises: an oven space with a bottom baking surface, two side walls rising up on opposite sides of the baking surface and at least one top wall facing the baking surface; burner means configured to raise the temperature of the oven space; and a control unit associated with the burner means and configured to drive them as a function of a command given by a user to determine a preset temperature inside the oven space.

According to the invention, the burner means comprise at least a first radiating element and a second radiating element which are independent of one another and which are configured to vary the temperature at the baking surface and at the top wall, respectively. In light of this, the control unit comprises at least a first drive module and a second drive module associated with the first radiating element and with the second radiating element, respectively, in order to control the radiating elements independently of one another.

In other words, the first drive module is connected to the first radiating element and the second drive module is connected to the second radiating element in order to vary/regulate the temperature in the proximity of the baking surface (floor) and of the top wall (ceiling) independently of one another.

Advantageously, that way, a user has the possibility of setting different temperatures for the two zones of the oven space, thereby optimizing baking efficiency for a wide range of food products, whether the products need to be baked uniformly or require different and, if necessary, changing, baking temperatures as a function of zone.

In this regard, it should be noted that the oven comprises at least one pair of temperature sensors (first and second) whose function is to measure the temperature in the proximity of the baking surface (floor) and of the top wall (ceiling) respectively.

Each of the temperature sensors is thus connected to a respective second drive module of the control unit to provide the latter with a signal representing the measured temperature Thus, the first temperature sensor is connected to (associated with) the first drive module, whilst the second sensor is connected to (associated with) the second drive module.

Each drive module is thus configured to drive the respective radiating element as a function of the temperature signal provided by the respective temperature sensor.

It should be noted that the drive modules might be distinct processors or simply different modules of the same processing unit.

In order to allow the user to easily check and control the temperature, the oven is also equipped with an interface panel associated with the control unit and having at least a first and a second control element which are associated with the first and the second drive module, respectively, and which can be accessed (or operated on) by the user to set the required temperature of the baking surface (floor) and top wall (ceiling).

The interface panel is also preferably equipped with display means (analog or digital) for each control element.

The display means are configured to show the user both the actual temperature measured by the temperature sensor in each zone of the oven (ceiling and floor) and the set temperature.

BRIEF DESCRIPTION OF THE DRAWINGS

Further features and advantages of the invention may be inferred from the following exemplifying, and hence non-limiting, description of a preferred embodiment of a gas oven used to bake food products, as illustrated in the accompanying drawings, in which.

DESCRIPTION OF THE PREFERRED EMBODIMENTS

Figure 1:
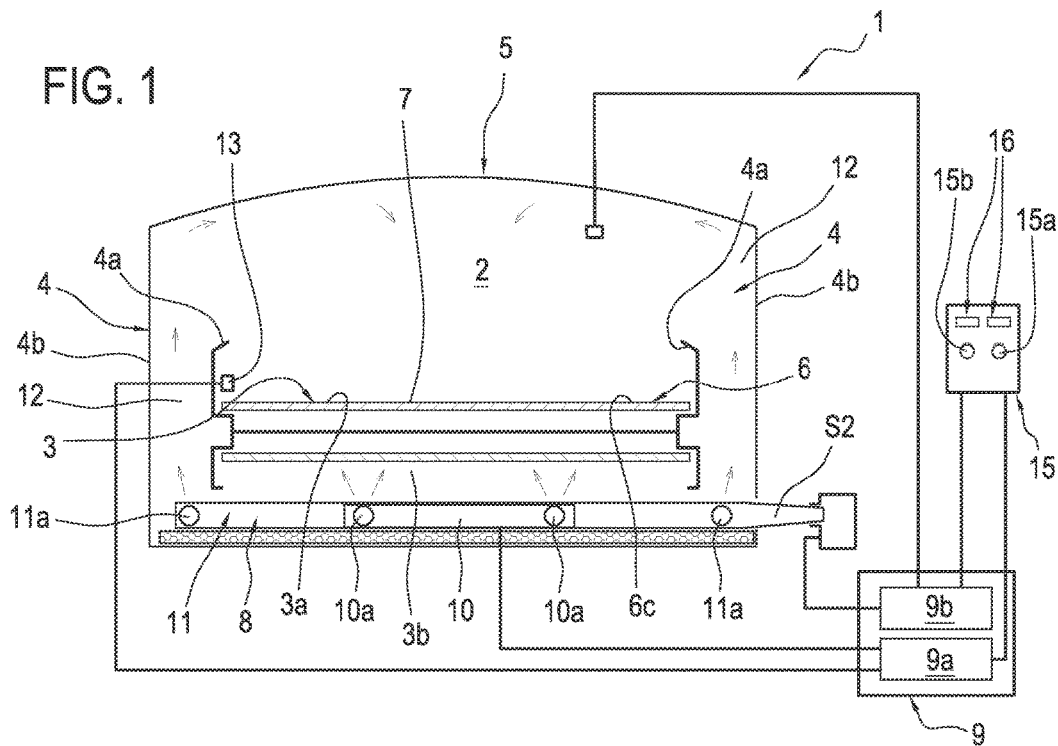
FIG. 1 is a schematic front view of a gas oven according to the invention, with some parts cut away in order to better illustrate others.
Figure 2:
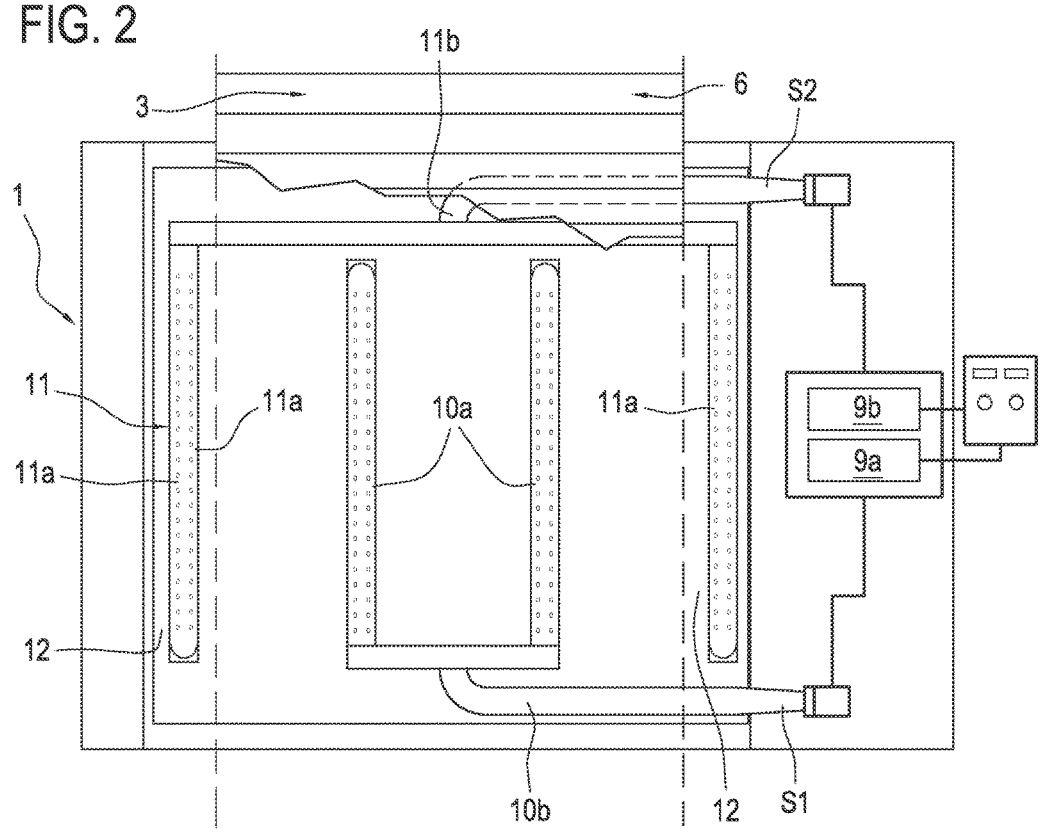
FIG. 2 is a schematic top view of the oven of FIG. 1, with some parts cut away in order to better illustrate others.
Figure 3:
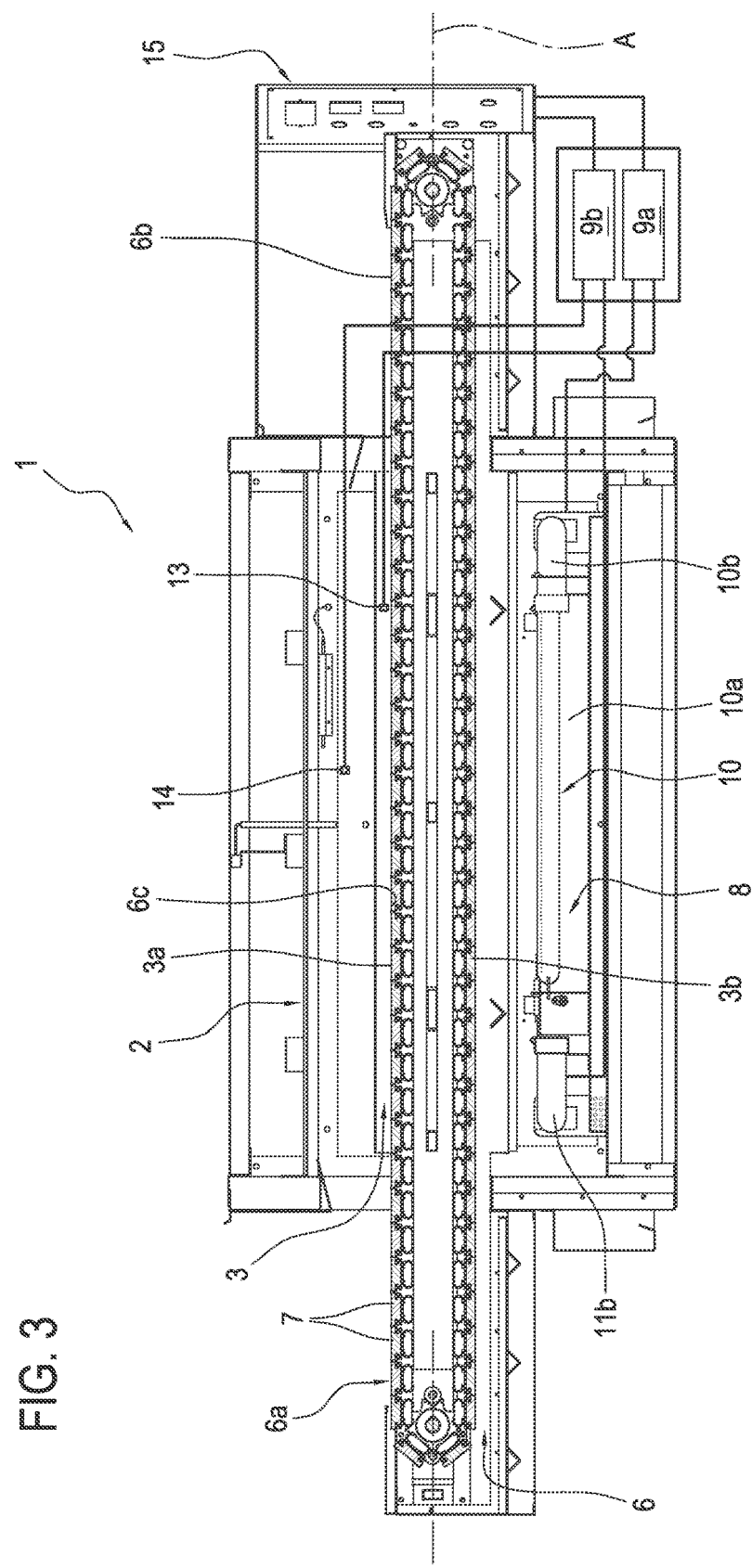
FIG. 3 is a longitudinal cross section of the oven of FIG. 1.

With reference to the accompanying drawings, the numeral 1 denotes a gas oven, preferably one used to bake food products, according to this invention.

The gas oven 1 is thus of the type used to bake food products, that is, configured to treat and bake food products such as, for example, pizza, focaccia, pita, tortillas, piadina, bruschetta, crostini and the like.

The oven according to the invention, however, may also be used to bake meat or other products.

For baking purposes, the oven 1 comprises an oven space 2 having a bottom baking surface 3, two side walls 4 and at least one top wall 5.

It should be noted that the bottom zone "P" of the oven space, that is, the zone proximal to the baking surface 3 will hereinafter be referred to as "floor", whilst the top zone "C" of the oven space, that is the zone distal from the baking surface 3, will hereinafter be referred to as "ceiling".

The baking surface 3 then has an upper side 3a, inside the oven space 2, and an underside 3b, opposite to the upper side 3a and facing away from the oven space 2.

The baking surface 3 preferably comprises at least one layer made of a material which is resistant to prolonged exposure to high temperatures (without, for example, reacting chemically with the other materials it comes into contact with.

In the embodiment illustrated, this layer is made from one or more flat hollow tiles 7 of refractory material. Alternatively, other suitable materials may be used.

It should be noted that the baking surface 3 may be fixed or mobile, depending on the type of oven.

In the embodiment illustrated, the baking surface 3 is mobile. More precisely, the baking surface 3 is defined by a conveyor belt 6 movable along its main direction of extension "A" and positioned to move across the oven space 2.

More precisely, each portion of the conveyor belt 6 is movable from a first stretch 6a, where the products to be baked are placed on it, to a second stretch 6b, where the baked products are withdrawn, passing by a third, baking stretch 6c located inside the oven space 2 to define the baking surface 3.

It should be noted that the conveyor belt 6 is preferably equipped with a plurality of the above mentioned hollow flat tiles 7 of refractory material.

Alternatively, the baking surface 3 might be movable in rotation. In this embodiment (not illustrated), the baking surface is defined by a turntable which rotates about its axis of rotation.

Further, in simplified embodiments, the baking surface 3 is fixed, that is to say, without any means for the movement thereof. In such an embodiment the oven space has three side walls and a front door for opening and closing it.

In order to heat the oven space 2, the oven 1 comprises burner means 8 (*gas*) configured to raise the temperature of the oven space 2 and a control unit 9 associated with the burner means 8 and configured to drive them as a function of a command given by a user to determine a preset temperature inside the oven space 2

According to the invention, the burner means 8 comprise at least a first radiating element 10 and a second radiating element 11 which are independent of one another and which are configured to vary the temperature at the baking surface 3 and at the top wall 5, respectively.

In this regard, the control unit 9 comprises at least a first drive module 9a and a second drive module 9b associated with the first radiating element 10 and with the second radiating element 11, respectively, in order to control them independently of one another Advantageously, it is thus easy to obtain differentiated adjustments of the temperatures at the floor "P" and ceiling "C" of the oven space 2, so as to optimize the baking process for numerous types of products, whatever type of baking is required The control unit 9 is preferably defined by an electronic card equipped with a processor.

Preferably, the control unit 9 comprises two electronic cards, each defining a respective drive module 9a, 9b.

More precisely, the oven 1 comprises at least a first temperature sensor 13 and a second temperature sensor 14.

The temperature sensors 13, 14 are designed to measure the temperature in the proximity of the baking surface 3 (that is, of the floor "P") and of the top wall 5 (that is, of the ceiling "C"), respectively.

They are connected, respectively, to the first drive module 9a and to the second drive module 9b of the control unit 9 to provide the respective drive module 9a, 9b with a signal representing the measured temperature.

Preferably, the first temperature sensor 13 is located in the bottom zone or floor "P" of the oven space 2.

Similarly, the second temperature sensor 14 is located in the top zone or ceiling "C" of the oven space 2.

In the embodiment illustrated, the temperature sensors are thermocouples mounted respectively in the proximity of the ceiling "C" and of the floor "P".

Alternatively, however, the temperature sensors might be sensors of another type.

Thus, the first drive module 9a and the second drive module 9b of the control unit 9 are configured to drive the respective radiating element 10, 11 as a function of the signal, representing the temperature, provided by the respective temperature sensor 13, 14.

More precisely, the radiating elements 10, 11 are each equipped with respective valve means (not illustrated) selectively adjustable between a closed configuration and a fully open configuration.

The drive modules 9a, 9b are programmed to send to the valve means a signal representing the closing or opening thereof as a function of the signal representing the temperature measured by the temperature sensors 13, 14.

More precisely, when the temperature measured by the sensors 13, 14 is greater than a set reference value, the drive modules 9a, 9b command the valve means of the respective radiating element 10, 11 to perform a closing movement to reduce fuel consumption and flame temperature.

On the other hand, when the temperature measured by the sensors 13, 14 is less than a set reference value, the drive modules 9a, 9b command the valve means of the respective radiating element 10, 11 to perform an opening movement to increase fuel consumption and flame temperature.

In order to allow setting the reference temperature (that is, the reference value), the oven 1 comprises an interface panel 15 associated with the control unit 9 and having at least a first control element 15a and a second control element 15b associated with the first drive module 9a and the second drive module 9b, respectively.

The first control element 15a and the second control element 15b are accessible to a user to allow setting a required temperature at the baking surface 3 (or floor zone "P") and at the top wall 5 (or ceiling zone "C").

The first control element 15a and the second control element 15b may thus be embodied, for example, by knobs, keyboards, touch screens or the like.

Each of the control elements 15a, 15b is thus connected (by wired or wireless means) to the respective drive module 9a, 9b of the control unit 9 to send to the latter a signal representing the value of the user-set (required) temperature for the respective zone (ceiling "C" or floor "P").

Each drive module 9a, 9b is then programmed (configured) to compare the signal representing the value of the temperature set (by means of the interface panel 15) with the signal representing the value of the temperature measured inside the corresponding zone of the oven space 2 (by the respective temperature sensor 13, 14) and configured to drive the radiating elements 10, 11 (more specifically, the valve means) as a function of this comparison, preferably following a predetermined algorithm.

In the preferred embodiment, the control panel 15 is also equipped with display means 16 (analog or digital) configured to show the user the temperature measured by the temperature sensors 13, 14 in the floor zone "P" and in the ceiling zones "C".

Furthermore, the display means 16 (thanks to a specific display or numbered scale) preferably also show the user the temperature to be set.

Looking in more detail at the components, it should be noted that the burner means 8 (that is, the first and the second radiating element 10 and 11) are preferably of atmospheric type.

In other words, each radiating element 10, 11 takes in air in a natural manner by the "Venturi effect".

More precisely, each radiating element 10, 11 is connected to a source of fuel (methane gas, LP gas or the like) through a pipe with a constricted section at an inlet point where the fuel flows in (thereby creating the Venturi effect).

Thus, the burner means 8 are located (at least partly) under the baking surface 3.

More precisely, the burner means 8 face the underside 3b of the baking surface 3.

In other words, the baking surface 3 is interposed between the burner means 8 and the top 5 of the oven space 2.

It should be noted that to allow the burner means 8 (located under the baking surface 3) to heat the ceiling zone "C", the second radiating element 11 faces at least one respective duct 12, located at least one side wall 4 of the oven space 2 and extending between an inlet section 12a, facing the second radiating element 12, and an outlet section 12b located in the proximity of the top wall 5 (that is, of the ceiling "C" of the oven space 2).

Preferably, the second radiating element 11 is located laterally of the baking surface 3, that is, at (and hence substantially aligned with, along the vertical) at least one side wall 4 of the oven space 2 (preferably both side walls).

Advantageously, therefore, varying the intensity of the flame in the second radiating element 11 has little (if no) effect on the baking surface 3, and hence on the floor zone "P" of the oven space 2.

Preferably, at least the second radiating element 11 comprises at least two tubular elements 11a located on opposite sides of the baking surface 3 (preferably in the proximity of it, and more preferably, under it).

In this regard, it should be noted that the oven 1 is equipped with at least two ducts 12, each located at a respective side wall 4 of the oven space 2 in order to allow heat to be carried towards the ceiling zone "C" of the oven space in a uniform (and balanced) manner.

The tubular elements each have a plurality (or multitude) of through holes to allow the heating flames to pass through.

These holes are directed upwards, that is to say, they are directed from the tubular element 11a itself towards the duct 12.

In the embodiment illustrated, the tubular elements 11a are positioned in such a way as to protrude laterally of the baking surface 3, so that the heat is directed upwards, that is, towards the ceiling "C" of the oven space 3 and not towards the floor "P".

It should be noted that the tubular elements are made preferably of a metallic material, preferably iron.

In the preferred embodiment, these tubular elements are chromium plated to increase their resistance.

Preferably, both of the tubular elements 11a of the second radiating element 11 are in fluid communication with a common gas feed duct "S2" by way of a pipe union or manifold 11b.

Thus, in the embodiment illustrated, the second radiating element 11 is substantially in the shape of a "U", where the stems of the "U" are the tubular elements 11a and the base is the manifold 11b.

More precisely, the shape of the second radiating element 11 illustrated substantially defines a "Y", where the end stem of the letter is defined by the gas feed duct "S2".

In order to heat the baking surface 3 (acting, preferably directly, on the underside 3b thereof), the first radiating element 10 is interposed between the two tubular elements 11a of the second radiating element 11.

Thus, the first radiating element 10 is located inside a section whose perimeter is at least partly defined by the second radiating element 11.

In the preferred embodiment, the first radiating element 10 also has at least one tubular element 10a located between the tubular elements 11a of the second radiating element 11.

Like these, the tubular element 10a also has a plurality (or multitude) of through holes to allow the heating flames to pass through.

These holes are directed upwards, that is to say, they are directed from the tubular element 10a itself towards the baking surface 3.

It should be noted that the tubular element 10a of the first radiating element 10 may have different shapes, for example the shape of a "P", a substantially circular shape or other shape.

In the preferred embodiment, however, the first radiating element 10 comprises (like the second) two tubular elements 10a (substantially parallel to each other) spaced from each other and facing the underside 3b of the baking surface 3.

Both of the tubular elements 10a are in fluid communication with a common gas feed duct "S1" by way of a pipe union or manifold 10b.

It should be noted that the manifold 10b of the first radiating element 10 is distinct from the manifold 11b (or feed duct) of the second radiating element 11.

Thus, the first radiating element 10 is also substantially in the shape of a "U" whose concavity is opposite to that of the second radiating element 11 and which is at least partly interpenetrated with the second radiating element.

Advantageously, that way, the manifolds 10b and 11b of the first and second radiating elements are located on opposite sides of the burner means 8, thus facilitating maintenance and/or installation It should also be noted that the first and the second radiating element 10 and 11 may be part of a single component (made as a single part or welded together) or, preferably, they may be distinct parts to be mounted separately (and more easily).

In the embodiment illustrated, the first and the second radiating element 10 and 11 extend parallel to the main direction of extension "A" of the baking surface 3 (conveyor belt 6) to act on the oven space 2 in its entirety.

Structurally, at least one side wall 4 of the oven has an inner partition 4a, delimiting the oven space 2, and an outer partition 4b, distal from the oven space 2 and spaced from the inner partition 4a to define the duct 12.

In other words, the duct 12 is defined by a gap made along the respective side wall 4.

Preferably, the inner partition 4a is curved at the upper end of it in order to direct the heat towards the centre of the top wall 5 (that is, towards the centre of the ceiling "C").

In this regard, the top wall 5 in turn has a concavity which faces the baking surface 3 so as to increase heat recirculation.

Preferably, there are two ducts 12, located at both side walls 4 and thus, the above applies to both.

With reference to the embodiment illustrated, where the baking surface 3 is defined by a conveyor belt 6, the side walls 4 extend parallel thereto and at the sides thereof.

The oven 1 is also equipped with ignition means (not illustrated), preferably embodied by electrically charged spark plugs, and/or with a safety device configured to detect the absence of the flame.

This device is preferably defined by a flame detector associated with the control unit 9 and configured to provide the latter with a signal indicating that there is no flame issuing from the burner means 8.

The control unit 9 is in turn programmed to close the valve means of the burner means 8 when it receives that signal, thus limiting the escape of non-combusted gas to the oven 1 and to the atmosphere.

The invention achieves the preset aims and brings major advantages.

In effect, the possibility of controlling the temperature of the ceiling and of the floor independently of one another, as already stated above, allows making the oven of this invention an "all-purpose" oven usable to bake products of different kinds.

Moreover, using two different radiating elements, located under or in the proximity of the baking surface makes it possible to keep the structure of the oven (with atmospheric burners) substantially similar to the structure of traditional ovens, thus allowing considerable savings in design and production costs.

What is claimed is:

1. A gas oven, comprising:
    an oven space, including a bottom baking surface, two side walls rising up on opposite sides of the bottom baking surface and a top wall facing the bottom baking surface;
    a burner system configured to raise a temperature of the oven space;
    a control unit associated with the burner system and configured to drive the burner system as a function of a command given by a user to determine a preset temperature inside the oven space;
    wherein the burner system comprises a first atmospheric burner located under the bottom baking surface and a second atmospheric burner located under and laterally of the bottom baking surface, the first and second atmospheric burners being independent of one another and configured to vary the temperature at the bottom baking surface and at the top wall, respectively;
    the oven including at least two ducts, each located at a respective one of the two side walls and extending between an inlet section, facing the second atmospheric burner, and a single outlet section located in a proximity of the top wall to carry heat from the second atmospheric burner to the top wall to allow uniform heating of an upper zone of the oven space;
    the control unit comprising a first drive module and a second drive module associated with the first atmospheric burner and with the second atmospheric burner, respectively, to control the first and second atmospheric burners independently of one another;
    wherein the second atmospheric burner comprises two tubular members located on opposite sides of the bottom baking surface so that each of the two tubular members faces a respective one of the two ducts and both of the two tubular members are in fluid connection with a common gas supply duct through a manifold,
    wherein the first atmospheric burner is interposed between the two tubular members of the second atmospheric burner to face an underside of the bottom baking surface for heating the bottom baking surface.

2. The gas oven according to claim 1, comprising a first temperature sensor and a second temperature sensor configured for detecting a floor temperature at the bottom baking surface and a ceiling temperature at the top wall, respectively, and connected to the first drive module and to the second drive module of the control unit, respectively, to make available to the respective drive module a signal representing the respective temperature detected; the first drive module and the second drive module being configured to drive the respective atmospheric burner as a function of the signal, representing the respective temperature, provided by the respective temperature sensor.

3. The gas oven according to claim 1, comprising an interface panel associated with the control unit and including a first control element and a second control element associated with the first drive module and the second drive module, respectively; the first control element and the second control element being accessible to a user to allow the user to set a desired floor temperature at the bottom baking surface and a desired ceiling temperature at the top wall, respectively.

4. The gas oven according to claim 1, wherein each of the two side walls includes an inner partition, delimiting the oven space, and an outer partition, distal from the oven space and spaced from the inner partition to define a respective one of the two ducts.

5. The gas oven according to claim 1, wherein the first atmospheric burner includes a tubular member facing an underside of the bottom baking surface and in fluid connection with a gas supply duct separate from a gas supply duct of the second atmospheric burner.

6. The gas oven according to claim 1, wherein the bottom baking surface includes a conveyor belt movable along a main direction of extension; the first atmospheric burner and the second atmospheric burner extending parallel to the main direction of extension to act on a whole of the oven space.

7. The gas oven according to claim 1, wherein the one of the two side walls includes an inner partition, delimiting the oven space, and an outer partition, distal from the oven space and spaced from the inner partition to define the at least one duct.

8. The gas oven according to claim 1, wherein the second atmospheric burner includes two tubular members located on opposite sides of the bottom baking surface so that each of the two tubular members faces a respective one of the two ducts and both of the tubular members are in fluid connection with a common gas supply duct through a manifold.

\* \* \* \* \*